United States Patent [19]

Berry et al.

[11] Patent Number: 4,852,089
[45] Date of Patent: Jul. 25, 1989

[54] METHODS AND APPARATUS FOR ALLOCATING TIME SLOTS AND FRAGMENTS ON COMMUNICATIONS LINES BETWEEN ADJACENT NODES IN A HIGH GRANULARITY SWITCHING SYSTEM

[75] Inventors: Kirk H. Berry, Gaithersburg; Asghar Mostafa, Silver Spring, both of Md.

[73] Assignee: Data General Corporation, Westboro, Mass.

[21] Appl. No.: 103,612

[22] Filed: Oct. 1, 1987

[51] Int. Cl.[4] .............................................. H04J 3/24
[52] U.S. Cl. .................................................... 370/95
[58] Field of Search ....................... 370/95, 89, 86, 79, 370/80

[56] References Cited

U.S. PATENT DOCUMENTS 4,718,061  1/1988  Turner ................................... 370/86
4,747,100  5/1988  Roach et al. .......................... 370/89
4,747,101  5/1988  Akaiwa et al. ........................ 370/89

FOREIGN PATENT DOCUMENTS 0248094  12/1985  Japan ..................................... 370/95

Primary Examiner—Douglas W. Olms
Assistant Examiner—Min Jung
Attorney, Agent, or Firm—Joseph J. Kaliko; Joel Wall; Leonard Suchyta

[57] ABSTRACT

A communications network comprising nodes interconnected by communication lines employs a method of allocating data rates to fragments of line bandwidth which facilitates efficient allocation of available line bandwidth. Each node maintains, for each communication line connected to it, a bit map means having a bit position associated with each fragment available in the line for keeping track of which fragments are available and which are in use. Identification of available bandwidth fragments in the line is then accomplished by finding appropriate bit values in the bit map means; fragments allocated are marked in the bit map means. A node thus need not allocate fragments contiguously, and available bandwidth is equally allocable by either of the two nodes interconnected by a particular line.

20 Claims, 4 Drawing Sheets

X = 0 : FRAGMENT AVAILABLE
X = 1 : FRAGMENT IN USE

METHODS AND APPARATUS FOR ALLOCATING TIME SLOTS AND FRAGMENTS ON COMMUNICATIONS LINES BETWEEN ADJACENT NODES IN A HIGH GRANULARITY SWITCHING SYSTEM

BACKGROUND OF THE INVENTION

1. Field of the Invention

This invention pertains to digital data communication systems.

2. Description of the Prior Art

Communication networks typically consist of a plurality of communications processing nodes connected via communication links, be they leased telephone lines, local area networks (LANs) or wideband span lines operating at 1.544 Mbps or higher. In addition, it is very common to initially deploy a limited number of nodes serving initially some limited number of mainframes and users, terminals, voice trunks and the like.

As a network application matures, the number of nodes invariably increases, and each node grows to support an ever-increasing number of customer-premises data processing and communications equipment. It invariably forces the users to obsolete the communications processing nodes, because nodes with sufficient reserve processing power are not purchased initially due to cost.

Lines to be serviced by a node are generally of two kinds: "CPE (customer premises equipment) side" and "network side". The CPE-side lines connect to and service such equipments as local terminals, PC's, LAN's, PBX's, and so forth, while the network-side lines connect the particular node to other nodes in the network. In general, lines coming in on the CPE side may carry data at relatively low data rates, while network-side lines are usually high-speed lines (e.g., T1 lines operating at 1.544 Mbps). It is customary to allocate data rates to network-side line bandwidths in 64 Kbps "slots", which means that a low data rate transaction makes inefficient use of such a slot. For a transaction requiring more than one slot, the prior art generally imposes the constraint that contiguous slots must be allocated; this sometimes leads to call blocking even though sufficient slots are available, because the available slots are not contiguous.

It is also customary for a node to allocate half of a line's bandwidth to transactions that it (the node) may allocate to that line, while reserving the other half for transactions that the node on the other end of that line may allocate to that line; under this arrangement, when a preponderance of transactions is being initiated from one "side" the allocation may be exceeded and calls will have to be blocked, even though unused capability remains allocated to the "other side".

SUMMARY OF THE INVENTION

This invention uses (a) dual-ported processor(s), with one such port being a standard computer bus, the other port being a traditional telecommunications serial wideband port, and (b) a communications wideband space or time-slot switch. The high speed switch connects one, two or more such processing resources to the local data processing and/or communication elements (data terminals, personal computers, PBX, etc) as well as to the rest of the user's network. When more features or elements are needed locally, or when the network grows larger and additional processing power is required, additional dual-ported processors are installed.

The 64 Kbps "slots" of the lines are further subdivided into individually allocable 8 Kbps "fragments", thus reducing the inefficiency introduced by allocating a low-rate transaction to 64 Kbps slot. The invention provides each node with a bit map for each line connected to a node for keeping track of fragment allocations, in which a bit position corresponds to each fragment and the bit occupying that position takes a value of 0 to indicate that the corresponding fragment is available or a value of 1 to indicate that it is in use. Available fragments can be found regardless of their position in the communications line, thus eliminating the need to allocate contiguous slots or contiguous fragments for a transaction requiring more than one. From the standpoint of a line interconnecting two nodes, the convention is employed that fragments will be allocated by one node starting from the "beginning" of the bit map, and by the other node starting from the "end" of the bit map; the prior-art drawback of inefficiency resulting from fixed allocations is thus eliminated. (It will be recalled that each node maintains a bit map for each line connected to it.) Each node informs the other of allocations by means of a signalling channel contained in the line so that each may keep its bit map current.

Other objects and advantages of the present invention will by understood by those of ordinary skill in the art, after referring to the detailed description of the preferred embodiments and the appended drawings wherein:

DESCRIPTION OF THE PREFERRED EMBODIMENT

Figure 1:
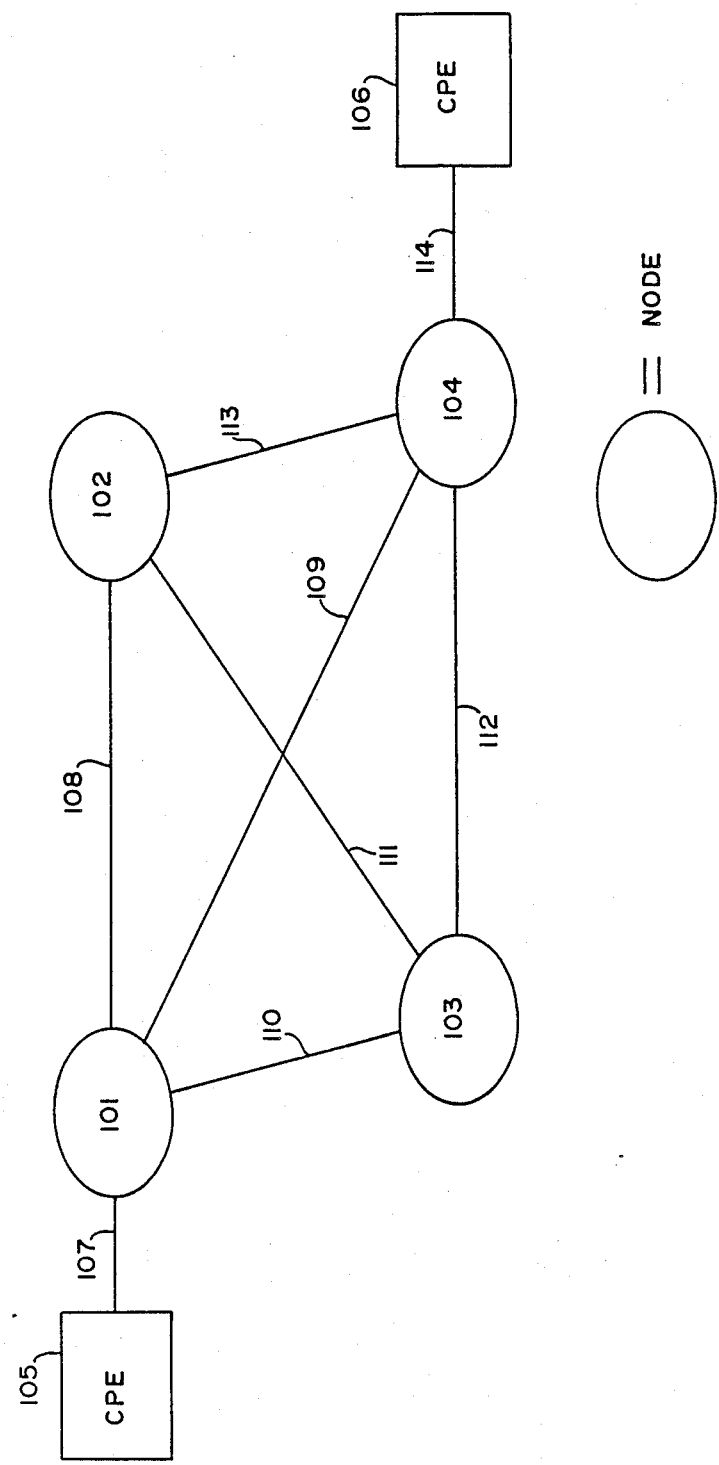
FIG. 1 (prior art) is a high-level functional representation of a typical digital data communication network comprising nodes interconnected by communication lines.

FIG. 1 depicts a typical network consisting of nodes 101, 102, 103 and 104 interconnected by communication lines. Some of the nodes are shown as having CPE equipment connected to them. (Node 101 is shown connected to CPE 105, and node 104 is shown connected to CPE 106.) In practice, any of the nodes may have CPE connected to them.

Figure 2:
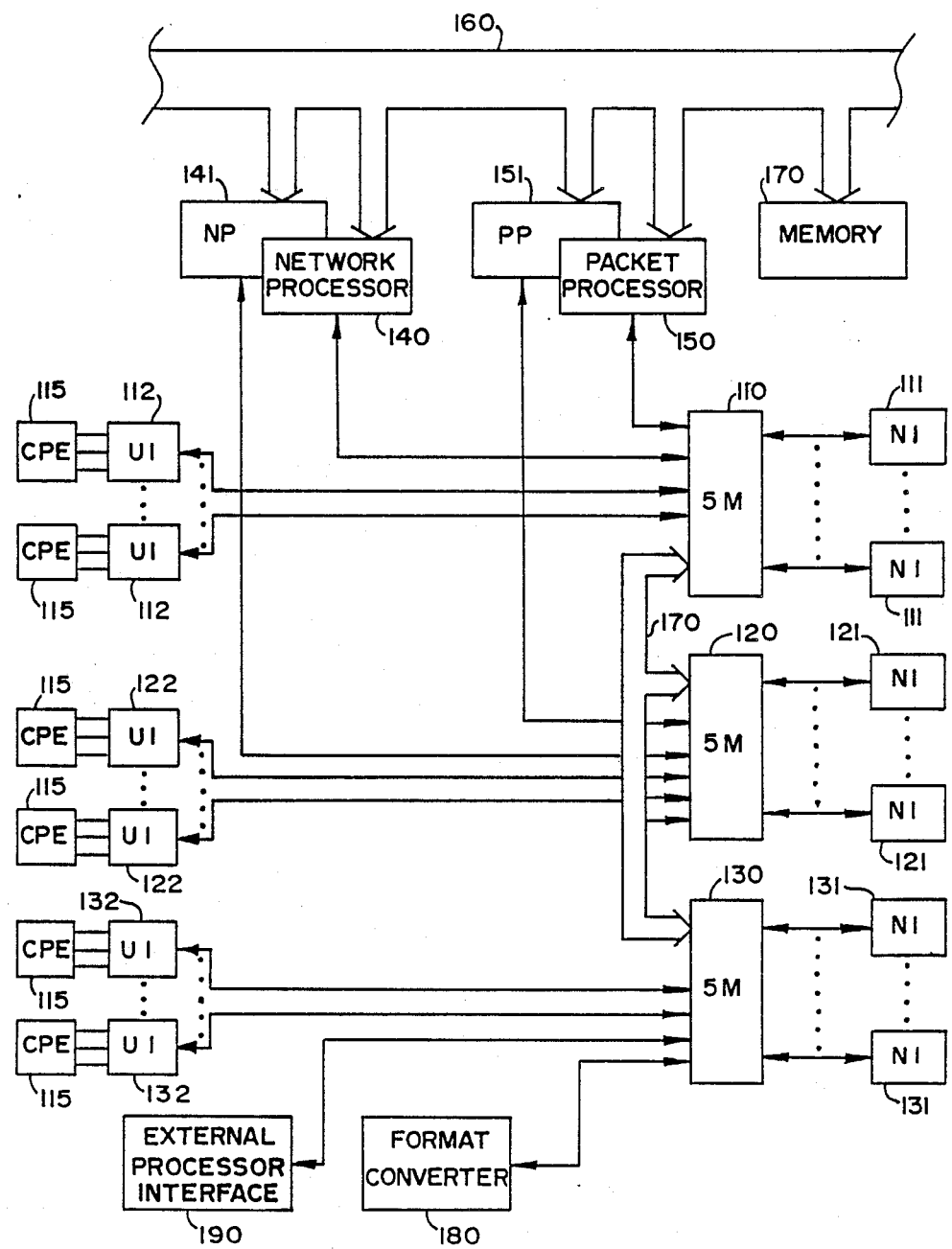
FIG. 2 is a block diagram of a node of the present invention

FIG. 2 shows internal detail of a typical node, comprising a wideband time-slot switch matrix (110, 120, 130) and a number of dual-ported Network Processors (140, 141) connected to each other via 2.048 Mbps serial links. The switch matrix permits connectivity between the network processors, as well as connecting them to the network and to local terminals, PCs and PBX (labeled as "CPE" (customer premises equipment) 115) via other similar serial links.

FIG. 2 also shows that each network processor is connected to a typical parallel computer bus 160. The network processors of the system can either be connected together with a single such bus, or in groups to more than one such bus. This way the necessary computing resources, such as memory 170, can be connected to the switch processors in a manner traditional to the computer industry.

The first network processor installed in the system is also programmed to control the switch matrix connections, such that particular users in the network require access to a given network processor, that connection is carried out by the first network processor upon receiving a command from that specific user.

On the other hand, asynchronous network processor to network processor interconnectivity is achieved over the computer bus, such as is required when two such network processor units are sharing a single communications processing function such as packet switching. For example, a packet received by network processor 140 which was destined to network processor 141, if sharing the same bus, simply hands off such packet to network processor 141 using either DMA or a "mailslot" technique.

If a node that has been installed with N network processors is showing inadequate performance, or must then perform additional functionality, network processor N+1 is added. Furthermore, if the bus bandwidth is inadequate for all the functions being performed in a single-bus system, a second computer bus can be added to the system to separate into separate computing groups the functions that are not interrelated.

Figure 3:
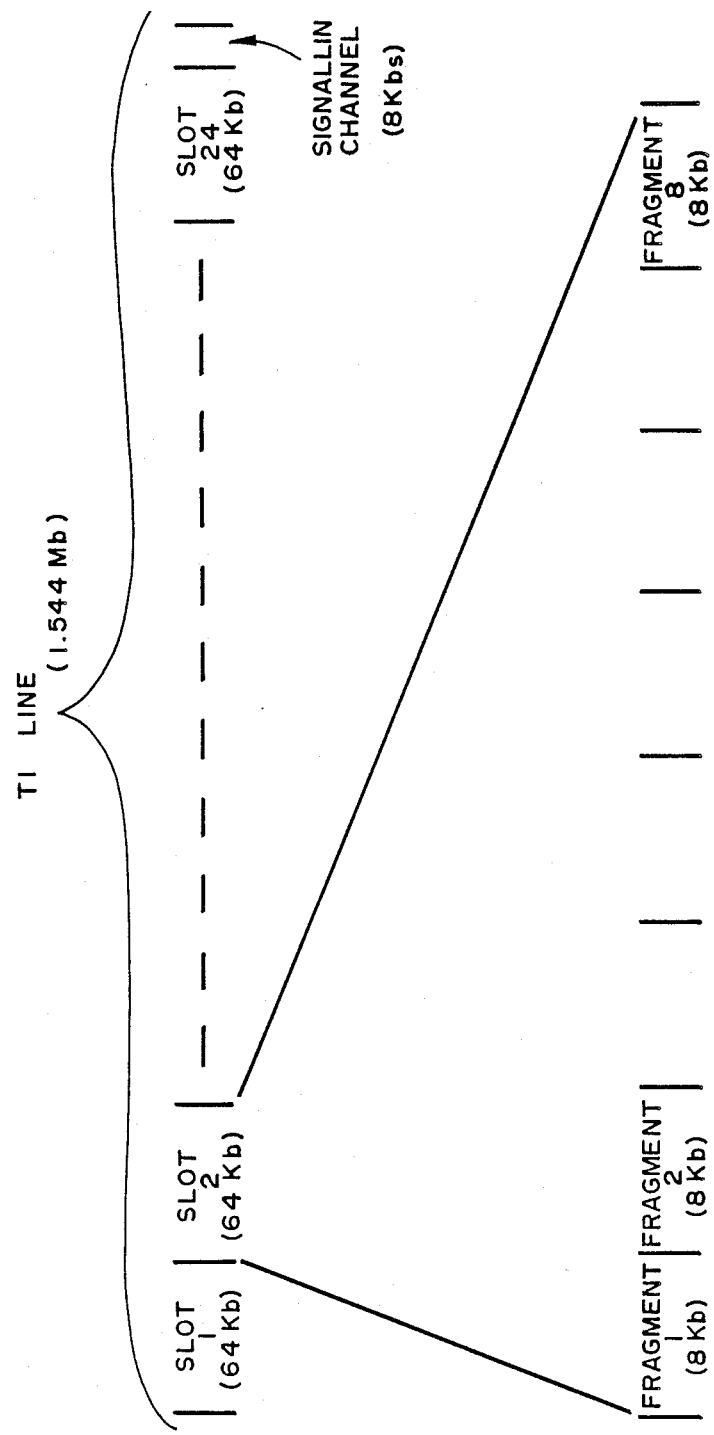
FIG. 3 depicts the allocation of a communication line into "slots" and "fragments"

FIG. 3 depicts the allocation of bandwidth of a 1.544 Mbps T1 communication line. The available bandwidth is divided into twenty-four 64 Kbps slots. (24×64 Kbps=1.536 Mbps; subtracting this from the 1.544 Mbps line bandwidth leaves 8Kbps available as a signalling channel.) Each 64 Kbps slot is further divided into eight "fragments" of 8 Kbps each.

As data begins flowing into a node for forwarding, a portion of the available bandwidth on the line on which that data appears is inherently taken up by the data, the portion being the data rate in bps of the data rounded up to the next highest 8 Kbps fragment. The node must allocate the corresponding amount of bandwidth on the line on which the data is to leave the node (which may or may not be the same line on which it comes in).

Figure 4:
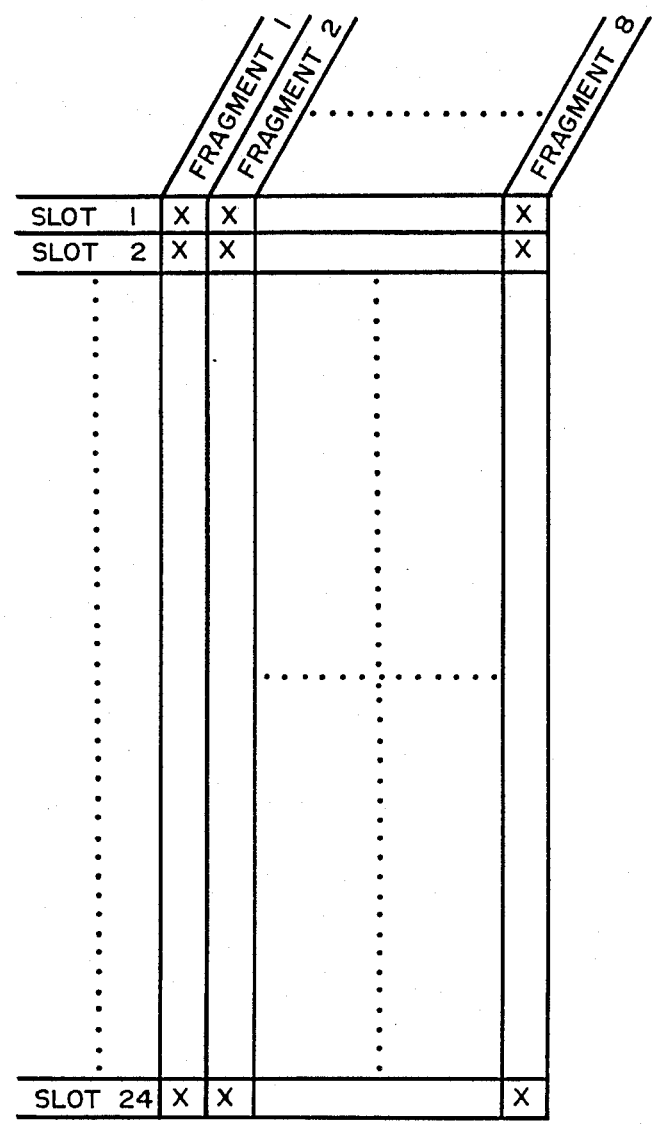
FIG. 4 depicts a bit map employed in the present invention.

To facilitate this allocation, bit maps for each line connected to the node are maintained by the network processor, within the memory 170 associated with it. The bit map for a line contains one bit position corresponding to each fragment of that line. Each bit position will contain a ONE to indicate that the corresponding fragment is in use and unavailable, or a ZERO to indicate that the corresponding fragment is available. The network processor can thus easily identify available fragments simply by searching through the bit map looking for ZERO bits. If more than one fragment is required, there is no necessity to assign contiguous fragments, as available fragments can be located anywhere in the line. By adopting the convention that fragments will be allocated for transactions originating from a given node from one end of the bit map, and for transactions originating from a node on the other end of a line from the other end of the bit map, there is no need to pre-allocate to either, enabling the system to be more efficient when a preponderance of transactions is originating from one side or the other. The bit map is delineated in FIG. 4. When a node allocates fragments of a line, it informs the node at the other end of that line by means of the signalling channel, and the other node updates its bit map accordingly. This scheme overcomes the prior-art drawback, under the scheme of allocating half the line's bandwidth to each node, of having to block calls when no bandwidth is available in one node's allocation, even though there might in fact be sufficient bandwidth on the line. Should the two nodes simultaneously allocate the last available bandwidth, this conflict will be resolved when each node informs the other, as described above, of having made such an allocation.

The invention may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a digital data communication system comprising a plurality of nodes interconnected by communication lines, each communication line having a bandwidth, the bandwidth being divided into "m" slots, each one of the plurality of nodes being for transporting data from any of the m slots of any of the communication lines connected thereto to any other of the m slots of any of the communication lines connected thereto, allocation control apparatus in each one of the plurality of nodes for controlling allocation of data bandwidth to one or more of the m slots of line bandwidth associated with each communication line connected to a given node, comprising:

a bit map means consisting of "m" bit locations, each bit location corresponding to a different slot on a given communication line between adjacent nodes, wherein each of said m bit locations is used for storing a binary bit which takes a value of ZERO for indicating that its corresponding slot is available or a value of ONE for indicating that its corresponding slot is in use and unavailable;

allocation means for identifying an available slot on said given communication line by locating a corresponding ZERO in the bit map means, assigning data bandwidth to the available slot, and marking the slot as being in use by recording a ONE in the slot's corresponding bit location in said bit map means; and deallocation means for deassigning data bandwidth from a slot, off said given communication line, and for marking the slot as available by recording a ZERO in the corresponding bit location in said bit map means.

2. The digital data communication system recited in claim 1 wherein each of said communication lines interconnects a first node and a second node adjacent to said first node, and includes a signalling channel for exchanging procedural information between the first node and the second node, and further wherein the allocation control apparatus within each of the plurality of nodes is further adapted such that:

the bit map means is linearly organized, having a first end and a second end opposite to the first end; and in the allocation means available slots are identified by the first node beginning from the first end of the bit map means, and by the second node beginning with the second end of the bit map means.

3. The digital data communication system recited in claim 2 wherein each of the two adjacent nodes further includes means for informing the other, via the signalling channel, of slot allocations it has made, and each of the two adjacent nodes further includes means for updating the bit map means for each communication line interconnecting the two adjacent nodes according to information thus received via the signalling channel.

4. In a digital data communication system comprising a plurality of nodes interconnected by communication lines, each communication line having a bandwidth, the bandwidth being divided into "m" slots, the slots each being subdivided into "n" fragments, each one of the plurality of nodes being for transporting data from any of the m×n fragments of any of the communication lines connected thereto to any other of the m×n fragments of any of the communication lines connected thereto, allocation control apparatus in each one of the plurality of nodes for controlling allocation of data bandwidth to one or more of the m×n fragments of line bandwidth associated with each communication line connected to a given node, comprising:

a bit map means consisting of m×n bit locations, each bit location corresponding to a different fragment on a given communication line between adjacent nodes, wherein each one of said m×n bit locations is used for storing a binary bit which takes a value of ZERO for indicating that its corresponding fragment is available or a value of ONE for indicating that its corresponding fragment is in use and unavailable;

allocation means for identifying an available fragment on a given communication line by locating a corresponding ZERO in the bit map means, assigning data bandwidth to the available fragment, and marking the fragment as being in use by recording a ONE in the fragments corresponding bit location in said bit map means; and deallocation means for deassigning data bandwidth from a fragment, off said given communication line, and for marking the fragment as available by recording a ZERO in the corresponding bit location in said bit map means.

5. The digital data communication system recited in claim 4 wherein each of said communication lines interconnects a first node and a second node adjacent to said first node, and includes a signalling channel for exchanging procedural information between the first node and the second node, and further wherein the allocation control apparatus within each of the plurality of nodes is further adapted such that:

the bit map means is linearly organized, having a first end and a second end opposite to the first end; and in the allocation means available fragments are identified by the first node beginning from the first end of the bit map means, and by the second node beginning with the second end of the bit map means.

6. The digital data communication system recited in claim 5 wherein each of the adjacent two nodes further includes means for informing the other, via the signalling channel, of fragment allocations it has made, and each of the two adjacent nodes further includes means for updating the bit map means for each communication line interconnecting the two adjacent nodes according to information thus received via the signalling channel.

7. A method of allocating bandwidth between adjacent nodes of a digital communication system including a plurality of nodes interconnected by communication lines, each communication line having a bandwidth divided into "m" slots, comprising the steps of:

(a) maintaining a local bit map at each of said nodes for each line connected to a given node, wherein each map has at least m bit locations, each of said m bits corresponding to a different slot on the line for which the bit map is being maintained and further wherein the state of each bit indicates whether a particular time slot is available;

(b) allocating bandwidth on a selected line connected to a given node by identifying an available time slot on said line utilizing the bit map being maintained at said node for said line; and (c) changing the state of the bit associated with the available time slot being allocated to thereby record that the time slot has been placed into use.

8. A method as set forth in claim 7 further comprising the step of deallocating previously allocated bandwidth on a selected line connected to a given node by changing the state of the bit corresponding to the time slot being dellocated.

9. A method as set forth in claim 8 wherein each bit map is linearly organized, having a first end and a second end opposite to said first end, and further wherein the step of allocating bandwidth on a selected line, connected to said given node and an adjacent node, is performed by identifying an available time slot starting at the first end of the bit map maintained at said given node for said selected line.

10. A method as set forth in claim 9 wherein said step of allocating bandwidth on said selected line is further performed by identifying an available slot starting at the second end of the bit map maintained at the adjacent node for said selected line.

11. A method of allocating bandwidth between adjacent nodes of a digital communications system including a plurality of nodes interconnected by communications lines, each communications line having a bandwidth divided into "m" slots, the slots each being subdivided into "n" fragments, comprising the steps of:

(a) maintaining a local bit map at each of said nodes for each line connected to a given node, wherein each map has at least m×n bit locations, each of said m×n bits corresponding to a different fragment on the line for which the bit map is being maintained and further wherein the state of each bit indicates whether a particular fragment is available;

(b) allocating bandwidth on a selected line connected to a given node by identifying an available fragment on said line utilizing the bit map being maintained at said node for said line; and (c) changing the state of the bit associated with the available fragment being allocated to thereby record that the fragment has been placed into use.

12. A method as set forth in claim 11 further comprising the step of deallocating previously allocated bandwidth on a selected line connected to a given node by changing the state of the bit corresponding to the fragment being deallocated.

13. A method as set forth in claim 12 wherein each bit map is linearly organized, having a first end and a second end opposite to said first end, and further wherein the step of allocating bandwidth on a selected line connected to said given node and an adjacent node is performed by identifying an available fragment starting at the first end of the bit map maintained at said given node for said selected line.

14. A method as set forth in claim 13 wherein said step of allocating bandwidth on said selected line is further performed by identifying an available fragment starting at the second end of the bit map maintained at the adjacent node for said selected line.

15. The digital communications system as set forth in claim 3 further comprising means for allocating time slots on a non-contiguous basis.

16. The digital communications system as set forth in claim 6 further comprising means for allocating fragments on a non-contiguous basis.

17. A method as set forth in claim 7 wherein said step of allocating bandwidth may be performed utilizing noncontiguous time slots.

18. A method as set forth in claim 11 wherein said step of allocating bandwidth may be performed utilizing noncontiguous fragments.

19. A digital communication system as set forth in claim 3 wherein the number of slots per line, m, is chosen such that the system exhibits at least an 8 kbps switching granularity.

20. A digital communications system as set forth in claim 6 wherein the number of fragments per line, $m \times n$, is chosen such that the system exhibits at least an 8 kbps switching granularity.

* * * * *